Dec. 3, 1935.  O. A. BANNER  2,022,703
GEAR TYPE COUPLING
Filed Jan. 29, 1934
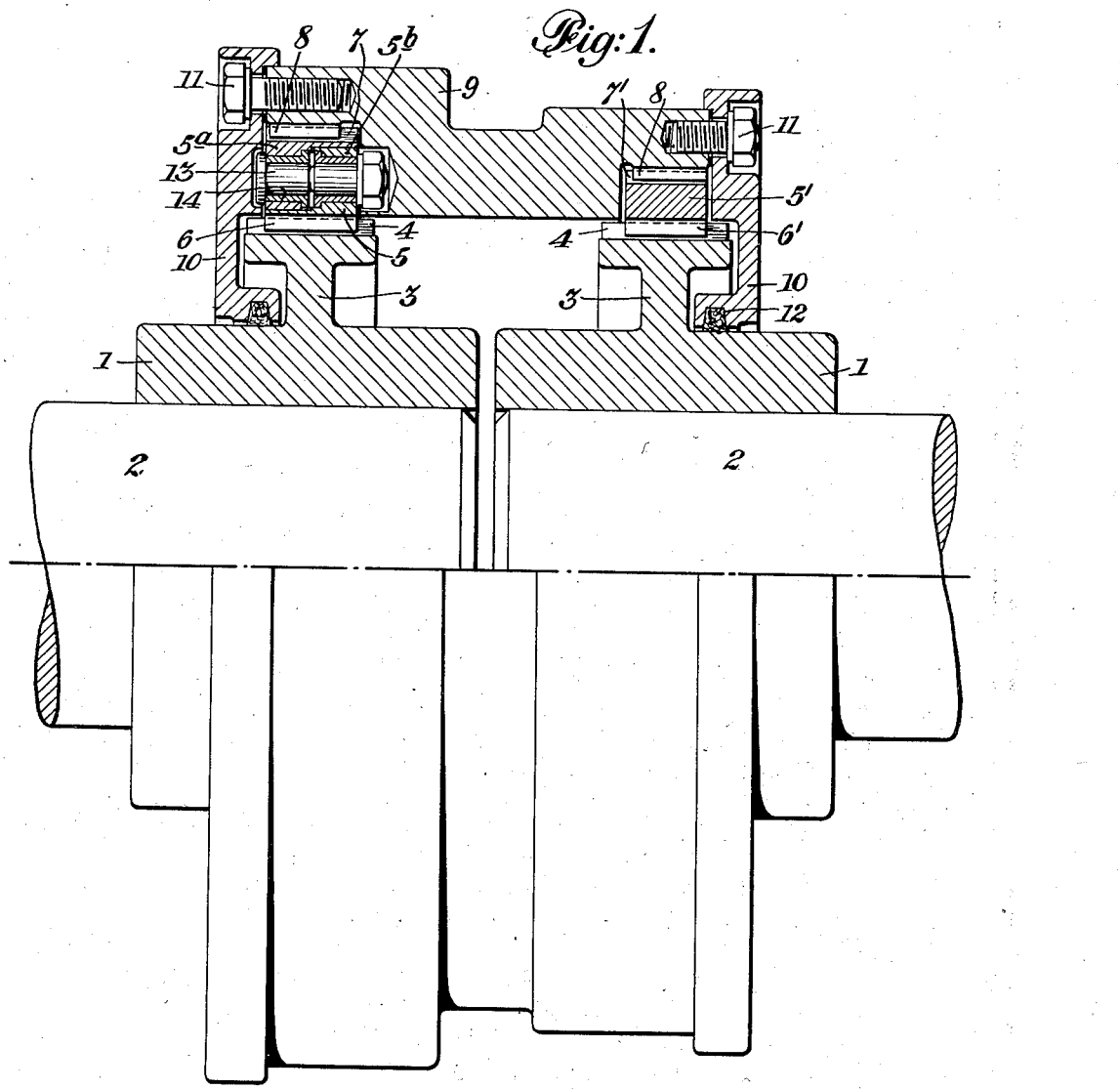
Fig:1.
Fig:2.
INVENTOR
Otto A. Banner
BY C. Campbell Hunicke
ATTORNEY Patented Dec. 3, 1935

2,022,703

UNITED STATES PATENT OFFICE 2,022,703

GEAR TYPE COUPLING

Otto A. Banner, New Brunswick, N. J., assignor to John Waldron Corporation, New Brunswick, N. J., a corporation of New Jersey Application January 29, 1934, Serial No. 708,740

2 Claims. (Cl. 64—9)

This invention relates to gear type couplings.

In Patent Number 1,905,431, I have described and shown a new form of gear type shaft coupling. The present invention is applicable to such a coupling and is intended to be used in cases where overloads of greater amounts may occur than the coupling was designed to take care of in order to prevent injury to the coupling or the connected machinery in case of such accidental overload.

One of the objects of this invention is to provide means for preventing the destruction of a gear type coupling in the event of accidental overloads beyond the capacity of the coupling or the connected machinery.

Other objects will appear more fully hereinafter.

Referring to the drawing:

Figure 1 is a view, partially in section and partially in elevation, of a coupling embodying the principles of my invention.

Figure 2 is a view of the shear pin without the securing nut.

In carrying out my invention, I propose to provide hubs 1 secured in any well known manner to shafts 2. Integral with hubs 1 are tooth rings 3 terminating in teeth 4. Surrounding tooth rings 3 are torque rings 5, 5', having internal teeth 6, 6', meshing with teeth 4, and external teeth 7, 7', meshing with teeth 8 formed in the cover 9. Cover 9 has end plates 10 secured by bolts 11. Packings 12 are secured between the end plates 10 and hubs 1 to retain the oil.

Torque ring 5 is a split ring and is formed of two parts 5a and 5b. Part b carries the internal teeth 6 and part a carries the external teeth 7. Parts 5a and 5b are held together by one or more pins 13. The holes through which pins 13 pass are lined with hardened bushings 14 so that in the event of the shearing of the pin 13 no damage will be caused to the other elements of the coupling. The bushings 14 are formed into pieces having their junction at a predetermined weakened portion 15 of pin 13. Pin 13 is weakened by groove 15 cut around the circumference.

In the event of an accidental overload, pin 13 shears prior to the breakage of the teeth of the gear coupling or of parts of the connected machinery as the pin is designed to break at a predetermined safe load.

It will thus be seen that where gear type couplings are used under conditions of variable load or shock where the stresses set up may exceed the capacity of the coupling or connected machinery as designed that the only damage that can occur is the breaking of the pin 13 which can be replaced at relatively small cost by removing the cover plate 10 withdrawing the split ring gear 5 securing the ring gear parts a and b with a new pin 13 and then replacing the ring gear and the cover plate 10.

What I claim is:

1. In a gear shaft coupling, a hub, teeth circumferentially of said hub, a cover having internal teeth, a torque ring gear formed of two separate elements, one of said elements having teeth meshing with the teeth on the hub, the other of said elements having teeth meshing with the internal teeth of said cover, a shear pin connecting said elements.

2. A gear shaft coupling, a hub, teeth circumferentially of said hub, a cover having internal teeth, two torque ring gears, said torque ring gears having teeth meshing with said internal teeth of the cover and said external teeth of the hub, one of said torque ring gears formed into two parts adapted to slide upon the other and thereby break the driving effect and a shear pin to normally connect the two parts together until a predetermined overload occurs.

OTTO A. BANNER.